(12) United States Patent
Mueller

(10) Patent No.: US 11,138,098 B2
(45) Date of Patent: Oct. 5, 2021

(54) DISK IMAGE SELECTION IN VIRTUALIZED NETWORK ENVIRONMENTS

(71) Applicant: AT&T Intellectual Property I, L.P., Atlanta, GA (US)

(72) Inventor: Julius Mueller, East Palo Alto, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 7 days.

(21) Appl. No.: 16/366,415

(22) Filed: Mar. 27, 2019

(65) Prior Publication Data

US 2020/0310950 A1  Oct. 1, 2020

(51) Int. Cl.
G06F 11/36 (2006.01)
G06F 9/455 (2018.01)
G06F 11/34 (2006.01)
G06F 11/30 (2006.01)

(52) U.S. Cl.
CPC .......... *G06F 11/3688* (2013.01); *G06F 9/455* (2013.01); *G06F 11/301* (2013.01); *G06F 11/3006* (2013.01); *G06F 11/3037* (2013.01); *G06F 11/3409* (2013.01); *G06F 11/3692* (2013.01)

(58) Field of Classification Search
CPC .... G06F 9/455; G06F 11/3006; G06F 11/301; G06F 11/3037; G06F 11/3409; G06F 11/3688; G06F 11/3692
USPC ........................................................ 717/126
See application file for complete search history.

(56) References Cited

U.S. PATENT DOCUMENTS

| | | | | |
|---|---|---|---|---|
| 8,819,772 | B2* | 8/2014 | Bettini | H04L 63/105 726/1 |
| 9,710,368 | B1* | 7/2017 | Gundeti | G06F 11/3692 |
| 2013/0086578 | A1* | 4/2013 | Eilam | G06F 9/45558 718/1 |
| 2013/0290932 | A1* | 10/2013 | Kruglick | G06F 11/3672 717/124 |
| 2014/0304815 | A1* | 10/2014 | Maeda | G06F 11/3604 726/22 |
| 2015/0089493 | A1* | 3/2015 | Goel | G06F 11/1484 718/1 |

(Continued)

OTHER PUBLICATIONS die.net, "ldd(1)—Linux man page," Feb. 7, 2019, last retrieved from https://web.archive.org/web/20190207024418/https://linux.die.net/man/1/ldd on Jan. 21, 2020. (Year: 2019).*

(Continued)

*Primary Examiner* — Andrew M. Lyons
(74) *Attorney, Agent, or Firm* — BakerHostetler

(57) ABSTRACT

A prioritized list of recommended disk images is created by providing software artifacts associated with a virtual network function that has access to a set of system libraries. Validation tests for the software artifacts are provided in the virtual network function is instantiated. The validation tests are run in the call invocations from the virtual network function to the set of system libraries is monitored. The system call invocations generated by the validation tests are analyzed and a list of required libraries based on system call invocations generated by the validation test is created. A list of recommended disk images with performance metrics are created and communicated to a developer.

19 Claims, 4 Drawing Sheets

(56) References Cited

U.S. PATENT DOCUMENTS

| | | | | |
|---|---|---|---|---|
| 2016/0162392 A1* | 6/2016 | Hu | ...................... | G06F 11/3684 |
| | | | | 714/38.1 |
| 2016/0299830 A1* | 10/2016 | Chastain | ............. | G06F 9/45558 |
| 2017/0192853 A1* | 7/2017 | Alberti | ................ | G06F 11/1451 |
| 2018/0025160 A1* | 1/2018 | Hwang | ................. | G06F 21/577 |
| | | | | 726/25 |
| 2018/0121340 A1* | 5/2018 | Krocek | ............... | G06F 11/3664 |
| 2019/0052548 A1* | 2/2019 | Kojukhov | ............... | H04L 43/50 |
| 2019/0280920 A1* | 9/2019 | Wang | ...................... | H04L 69/22 |

OTHER PUBLICATIONS

C. Makaya and D. Freimuth, "Automated virtual network functions onboarding," 2016 IEEE Conference on Network Function Virtualization and Software Defined Networks (NFV-SDN), Palo Alto, CA, 2016, pp. 206-211. (Year: 2016).*

P. L. Ventre et al., "Performance evaluation and tuning of Virtual Infrastructure Managers for (Micro) Virtual Network Functions," 2016 IEEE Conference on Network Function Virtualization and Software Defined Networks (NFV-SDN), Palo Alto, CA, 2016, pp. 141-147. (Year: 2016).*

L. Bondan, C. R. P. dos Santos and L. Z. Granville, "Comparing virtualization solutions for NFV deployment: A network management perspective," 2016 IEEE Symposium on Computers and Communication (ISCC), 2016, pp. 669-674, doi: 10.1109/ISCC.2016.7543814. (Year: 2016).*

P. Stephanow and N. Fallenbeck, "Towards Continuous Certification of Infrastructure-as-a-Service Using Low-Level Metrics," 2015 IEEE 12th Intl Conf on Ubiquitous Intelligence and Computing (UIC-ATC-ScalCom), 2015, pp. 1485-1492. (Year: 2015).*

* cited by examiner

| VM-1 | VM-2 | VM-3 |
|------|------|------|
| VM-4 | VM-5 | VM-6 |
| VM-7 | VM-8 | VM-9 |

FIG. 4

| VM-1 | VM-2 | VM-3 | | |
|------|------|------|---|---|
| | | VM-4 | | |
| | | VM-5 | | |
| VM-6 | VM-7 | VM-8 | VM-9 | Saved and Free Resources |

FIG. 5

DISK IMAGE SELECTION IN VIRTUALIZED NETWORK ENVIRONMENTS

TECHNICAL FIELD

The present disclosure relates to the selection of disk images in a network environment. More particularly, the disclosure relates to a method, system, and non-transitory computer readable media for improving the selection of disk images in a virtualized network environment.

BACKGROUND

The information technology industry is transforming from dedicated servers towards commercial off-the-shelf (COTS) public and private cloud infrastructures. In that environment software is decoupled from dedicated hardware to enable software to run in the cloud independent from the dedicated hardware. Decoupling software from hardware results in cost savings, much higher flexibility, and better resource utilization.

For simplicity of control and management, security through isolation, charging purposes and modularization, the software is decoupled from dedicated hardware and is instead bundled into self-contained network functions (NF) as virtual NF (VNF). The life-cycle of a VNF can be controlled on demand as the service is needed, which enables the fast lifecycle management of services. This newly gained flexibility allows instances to be brought up and be terminated on-demand based on the load situation in any given amount. Control and management of VNFs is done through an orchestrator.

VNFs can be complex in size such as Virtual Machines (VM), smaller in form of Containers (C) or minimalistic as Micro-Kernels (MC) or Lambda-functions (L). For example, a "hello-world program" can run in a VM, C, MC or L, whereas a windows-10-based-program can only run in a VM using a disk image. Whereas the result of the function is equal, the related costs are very different in terms of CPU requirements, RAM requirements, and the disk footprints required to run the VNF.

Disk images are provided either publicly by companies, as Open Source or are created privately by a software developer or DevOps during the service design time or implementation.

Currently, the process of disk image selection is handled by the software developer or DevOps, who defines which image file to use for a VNF. The selection and specification are done in configuration files such as Heat template, Dockerfile, Vagrantfile, etc. Consequently, the selection of the disk image is based on the best-practice of the software developer or DevOps person, but not on an analytical process. The size of the disk image matters and is of high importance, since it relates directly to the agility of the system, the service boot-time and reaction time.

In order to start a new service as a VNF, the disk image is first identified and selected, then the disk image is downloaded from a network, configured, booted, services may also be configured and installed, additionally, the service endpoint may need to be made available in a micro service environment. System and security updates/upgrades may be required, which—depending on the image size may take minutes for completion. Some updates require a restart.

The general VNF service boot and starting time can be defined as a function of (image download time+image boot up time into memory+service configuration and installation time+system and security updates, and service registration time).

No mechanism exist today that provides recommendations for disk images for software running within the VNF. Current best practice is the use of disk images selected by the software developer and/or DevOps team.

SUMMARY

One general aspect includes a method where a software module (test system) receives a software artifact associated with a virtual network function (system under test) having access to a set of system libraries. The software module then receives a validation test manifest for the software artifact, and a list of available disk images. The software module instantiates the virtual network function and runs the validation tests. System call invocations from the virtual network function in the guest system down into the set of system libraries exposed by the host system caused by the validation test are monitored. The system call invocations generated by the validation test, are analyzed, recorded and finally a list of required libraries based on the system call invocations generated by the validation test is created. A prioritized list of recommended disk images with performance metrics is then created.

Another aspect includes a system having at least one memory that stores computer executable instructions and at least one processor communicatively coupled to the at least one memory that facilitates execution of computer executable instructions. The computer executable instructions include instructions to provide software artifacts associated with the virtual network function having access to a set of system libraries. The computer executable instructions also include instructions to provide a validation test for the software artifact and a list of available disk images. Additional instructions to instantiate the virtual network function and run the validation test are provided. The system call invocations from the virtual network function to the set of system libraries caused by the validation tests are monitored. The system call invocations generated by the validation test, are analyzed and a list of required libraries based on the system call invocations generated by the validation test is created. Instructions to create a prioritized list of recommended disk images with performance metrics are also included.

Another aspect includes non-transitory computer readable media including computer executable instructions that when executed perform a method. The method performed includes receiving a software artifact associated with the virtual network function having access to a set of system libraries. The method performed also includes providing a validation test for the software artifact. The instructions further include instructions to perform the step of instantiating the virtual network function and running the validation tests. The instructions also include functionality to monitor system call invocations from the virtual network function to a set of system libraries caused by the validation test. Further instructions to analyze the system call invocations generated by the validation test are provided as well as instructions to create a list of required libraries based on the system call invocations generated by the validation test. The method implemented by the computer readable software also includes a step of creating a prioritized list of recommended disk images with performance metrics.

BRIEF DESCRIPTION OF THE DRAWINGS

FIG. 4 is a block diagram illustrating an example of a server with static disk image selection.

FIG. 5 is a block diagram illustrating an example of a server with a dynamic disk image selection.

DETAILED DESCRIPTION OF ILLUSTRATIVE EMBODIMENTS

Glossary

Figure 1:
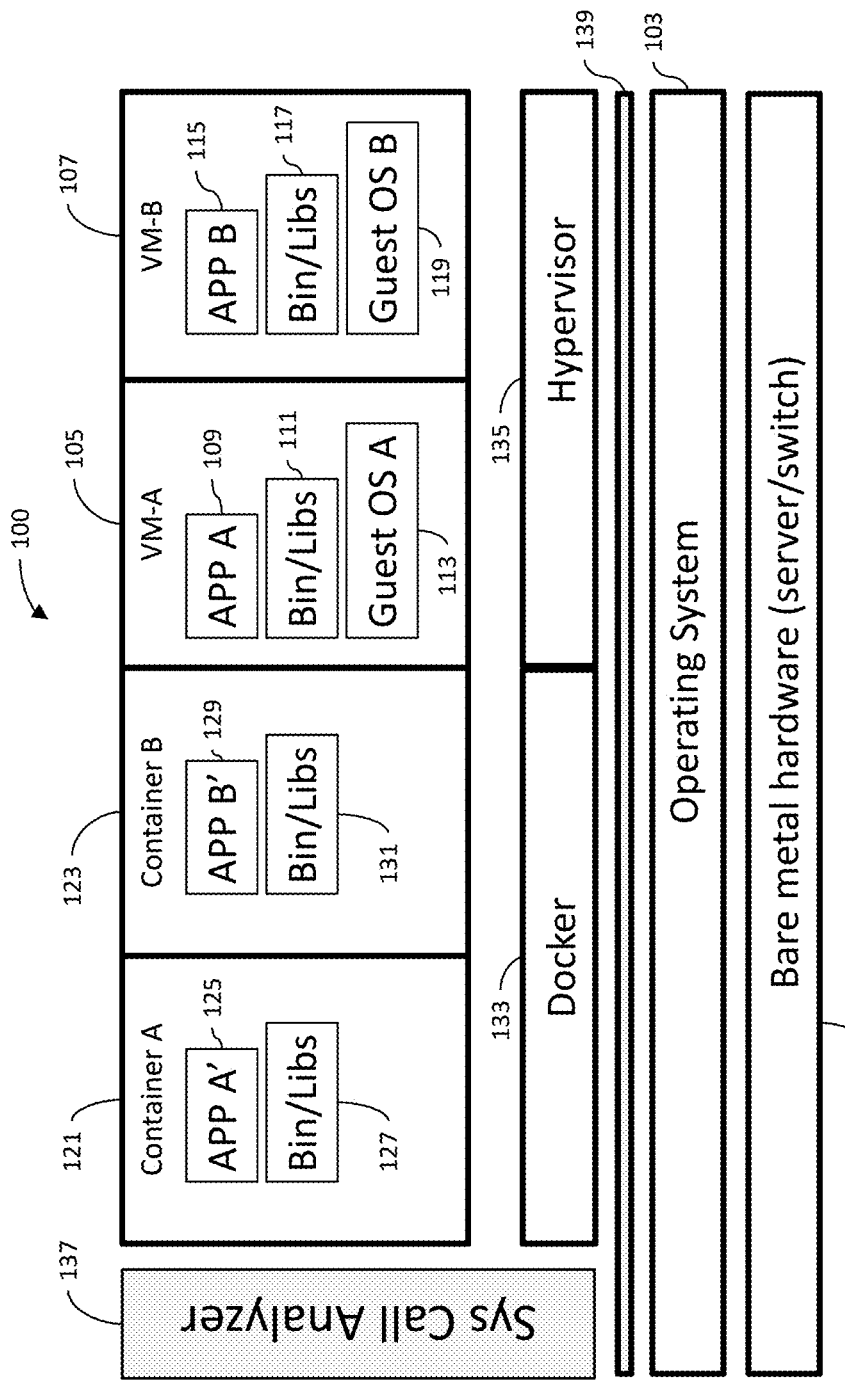
FIG. 1 is a block diagram of a representative virtualized network environment.

Artifact. An artifact is one of many kinds of tangible by-products produced during the development of software. Some artifacts (e.g., use cases, class diagrams, and other Unified Modeling Language (UML) models, requirements and design documents) help describe the function, architecture, and design of software. Other artifacts are concerned with the process of development itself—such as project plans, business cases, and risk assessments.

Bare metal server. A bare metal server is a physical server dedicated to a single tenant. The server's tenant can optimize the server according to its needs for performance, security and reliability. On a bare metal server, the operating system is installed directly on to the server, eliminating layers and delivering better performance.

Bare metal switches. Bare metal switches are switches from original design manufacturers (ODMs) with no network operating system loaded on them.

Binary Files. Binary files (Bins) include image files, sound files, executable (i.e., runnable) programs and compressed data files. typically done by a linker.

Container. Containers provide a standard way to package an application's code, configuration, and dependencies into a single object. Containers share an operating system installed on the server and run as resource-isolated processes, ensuring quick, reliable, and consistent deployments, regardless of environment.

DevOps. DevOps is a set of software development practices that combines software development with information technology operations to shorten the systems development life cycle while delivering features, fixes, and updates frequently in close alignment with business objectives. One key element is to allow the software developer owning the service by operating it.

Disk Image. A disk image, in computing, is a computer file containing the contents and structure of a disk volume or of an entire data storage device, such as a hard disk drive, tape drive, floppy disk, optical disc, or USB flash drive. A disk image is usually made by creating a sector-by-sector copy of the source medium, thereby perfectly replicating the structure and contents of a storage device independent of the file system. Depending on the disk image format, a disk image may span one or more computer files. The file format may be an open standard, such as the ISO image format for optical disc images, or a disk image may be unique to a particular software application.

Docker. Docker is a computer program that performs operating-system-level virtualization. Docker is used to run Containers. Containers are isolated from each other and bundle their own application, tools, libraries and configuration files; they can communicate with each other through well-defined channels. All containers are run by a single operating-system kernel and are thus more lightweight than virtual machines.

Hypervisor. A hypervisor is computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources.

Instantiation. In object-oriented programming (OOP), an instance is a concrete occurrence of any object, existing usually during the runtime of a computer program. Formally, "instance" is synonymous with "object" as they are each a particular value (realization), and these may be called an instance object; "instance" emphasizes the distinct identity of the object. The creation of an instance is called instantiation.

Library. A library (Lib) is a collection of subroutines or classes used to develop software. Libraries contain code and data that provide services to independent programs. Libraries are used in software development to modularize code, make it reusable and accessible over well-defined methods or Application Programmable Interfaces (APIs).

Operating System. An operating system (OS) is system software that manages computer hardware and software resources and provides common services for computer programs.

Validation Testing. Validation testing is the process of evaluating software during the development process or at the end of the development process against a set of criteria to determine whether it satisfies specified business requirements. Validation Testing ensures that the product actually meets the client's needs. It can also be defined as to demonstrate that the product fulfills its intended use when deployed on appropriate environment.

Validator. A validator is a computer program used to check the validity or syntactical correctness of a fragment of code or document. The term is commonly used in the context of validating syntax or semantic of documents, software code or RSS feeds though it can be used for any defined format or language.

Virtual Machine. A virtual machine (VM) is an emulation of a computer system. Virtual machines are based on computer architectures and provide functionality of a physical computer. Their implementations may involve specialized hardware, software, or a combination thereof. VM allow vertical scalability by adjusting system parameters such as used vCPU, RAM, storage or networking in a programmable manner.

Virtual Network Function. Virtual network functions (VNFs) are virtualized tasks formerly carried out by proprietary, dedicated hardware. VNFs move individual network functions out of dedicated hardware devices into software that runs on commodity hardware. These tasks, used by both network service providers and businesses, include firewalls, domain name system (DNS), caching or network address translation (NAT) and can run as virtual machines (VMs).

Illustrated in FIG. 1 is an embodiment of a virtualized network environment 100. The virtualized network environment 100 includes bare metal hardware 101, which may be a bare metal server or a bare metal switch. Associated with the bare metal hardware 101 is a host operating system 103. The host operating system 103 is the software installed on the bare metal hardware 101 that interacts with the underlying bare metal hardware 101. The virtualized network environment 100 includes a hypervisor 105 which acts as a virtual machine (VM) manager, and is a software program that allows users to host multiple VMs on the bare metal hardware 101. It sits between the hardware and VMs, and allocates resources like memory, bandwidth and disk storage to the VMs. The main purpose of the hypervisor 1105 is to meet the needs of VMs running on the host machine and ensure those VMs do not interrupt each other.

The virtualized network environment 100 may include a plurality of virtual machines (e.g. VM-A 105 and VM-B 107). VM-A-105 may include an application A (App A 109), binary files and/or libraries (Bin/Libs 111) and a guest operating system (Guest OS A 113). VM-B 107 may include an application B (App B 115), binary files and/or libraries (Bin/Libs 117) and a guest operating system (Guest OS B 119). The virtualized network environment may also include a plurality of containers (Container A 121 and Container B 123). Container A 121 may include an application (App A' 125) and binary files and/or libraries (Bin/Libs 127). Container B 123 may include an application (App B' 129) and binary files and/or libraries (Bin/Libs 131). A recursive structuring of VMs and Containers on top of an initial bare-metal host system is possible (e.g., a VM sitting on top of a bare metal host system, where the VM comprises one or more VMs or containers).

Associated with Container A 121 and Container B 123 is a Docker engine 133. Docker is a platform for developers and system administrator to develop and run applications. Docker lets developers quickly assemble applications from components. Docker allows the fast testing and deployment of code into production.

In an embodiment, the virtualized network environment 100 is provided with a sys call analyzer 137 which gives service owners a recommendation on which disk image to use to run their virtual network function most effectively. Sys call analyzer 137 implements a process where all system and software library calls of the services (App A' 125, App B' 129, App A 109 and App B 115) are analyzed while executing a full functional test of the software, in which all features are invoked at least once. Interception points exist between operating system 103 and the docker engine 133; and between the operating system 103 and the hypervisor 135. Interception points also exist between docker engine 133 and Bin/Libs 127; and between the docker engine 133 and Bin/Libs 131. Interception points also exist between hypervisor 135 and Guest OS A 113; and between hypervisor 135 and Guest OS B 119. Further interception points exist between App A' 125 and App B' 129 and their respective bins/libs, Bin/Libs 127 and Bin/Libs 131. Other interception points exist between Guest OS A 113 and Bin/libs 111; and between Guest OS B and Bin/libs 117.

Figure 2:
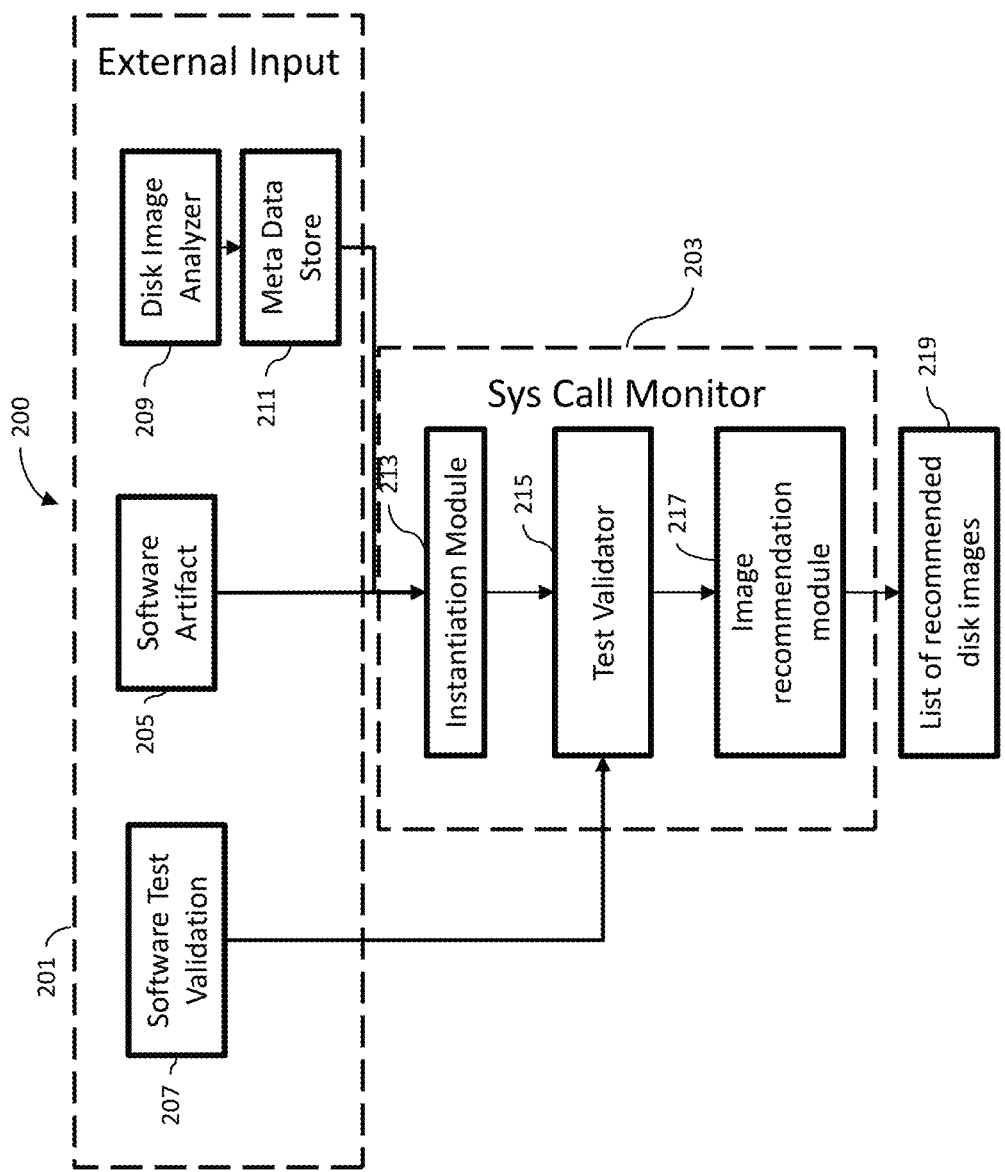
FIG. 2 Is a block diagram of a system for specifying a better performing disk image in a virtualized network environment.

Illustrated in FIG. 2 is a block diagram of a system 200 for selecting a disk image. The system 200 includes an external input module 201 and a Sys Call monitor 203. External input module 201 includes a source of software artifacts 205 and a source of software validation tests 207. External input module 201 also includes a disk image analyzer 209 and a metadata store 211. The disk image analyzer 209 analyzes all or a subset of the available disk images and creates a portfolio of available disk images that may be stored in Metadata store 211. The data identifying the portfolio of available disk images is provided to the Sys Call Monitor 203. The external input module 201 provides the software artifacts, the validation tests and the portfolio of available disk images to the Sys Call Monitor 203.

Sys Call monitor 203 includes an instantiation module 213, a test validator 215 and an image recommendation module 217. The instantiation module 213 instantiates the virtual network function for which a disk image is required. The test validator runs all provided tests for a given software on all disk images identified by the disk analyzer. The image recommendation module 217 creates a list of recommended disk images 219 with associated test metrics that enables the developer to choose the disk image best suited for the virtual network function.

Figure 3:
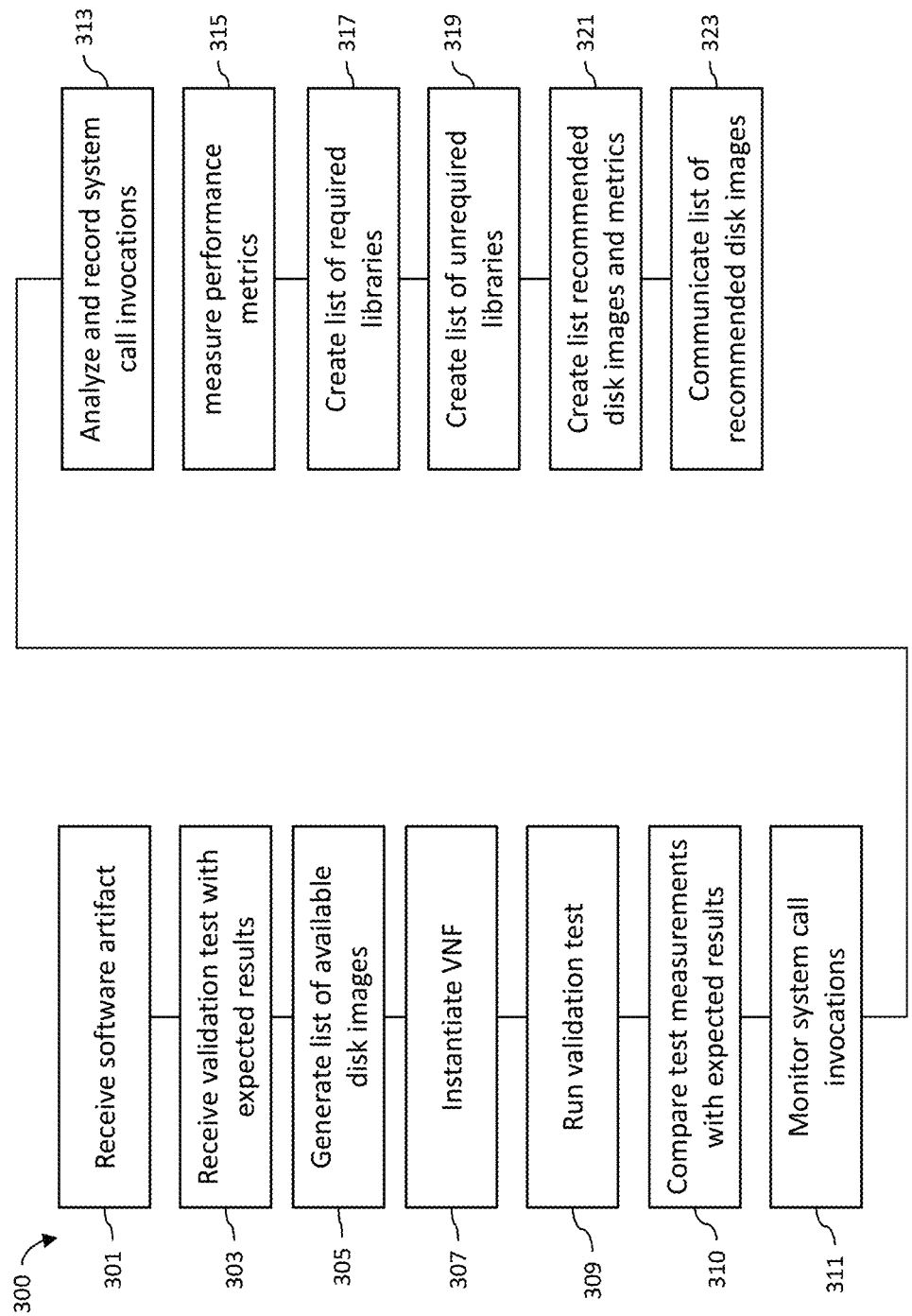
FIG. 3 is a flowchart of a method for specifying an a better performing disk image in a virtualized network environment.

Illustrated in FIG. 3 is a flowchart of a method 300 for specifying available disk images with associated test metrics.

In step 301, the Sys Call monitor 203 receives a software artifact from the developer.

In step 303, the Sys Call monitor 203 receives full list of VNF validation tests from a developer together with a list of expected results.

In step 305 a disk image analyzer analyzes all or a subset of most common available disk images and generates a list of available disk images. Metadata related to the available disk images is stored in a data store.

In step 307, the Sys Call monitor 203 instantiates an NFV.

In step 309 the Sys Call monitor 203 runs, on a NFV instances validator, all tests listed in the list of VNF validation tests for a given software on all disk images identified by the disk analyzer.

In step 310 test measurements are compared against expected results

In step 311 the Sys Call monitor 203 monitors the system call invocations.

In step 313 the Sys Call monitor 203 analyzes the system call invocations.

In step 315 the Sys Call monitor 203 measures the performance metrics related to the system call invocations generated by the provided tests are analyzed and the performance, startup time, correctness of VNF are determined. All system and software library calls of the service are analyzed while executing a full functional test of the software, in which all features are invoked at least once.

In step 317 a list of required system and software libraries may be created.

In step 319 a list of unrequired system and software libraries may be created.

In step 321 a prioritized list of recommended disk images is created with performance metrics to enable the developer to select a disk image with improved performance.

In step 323 the prioritized list of recommended disk images is communicated to the developer.

FIG. 4 illustrates an example of a server with static disk image selection. In this example, virtual machines VM 1, VM 2, VM 3, VM 4, VM 5, VM 6, VM 7, VM 8 VM 9 each may require 4 vCPU, 8 GB RAM, and 30 GB of disk space. With static disk image selection, the server would be dimensioned with 36 vCPU, 72 GB RAM and 270 GB disk space. All resources would be claimed and utilized.

FIG. 5 illustrates an example of a server with dynamic disk image selection. In this example, the SYS Call monitor 203 may determine that the VM's may require various sizes of vCPU, GB RAM and GB disk space. The server would be dimensioned similarly but not all resources would be claimed or utilized. Therefore, fewer servers are required or more services can be instantiated on the same hardware.

The method described may be implemented by computer-executable instructions that may run on one or more computers. The method also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the method can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the method may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

While the foregoing is directed to embodiments of the present disclosure, other and further embodiments of the disclosure may be devised without departing from the basic scope thereof, and the scope thereof is determined by the claims that follow.

What is claimed:

1. A method comprising:
   receiving a software artifact associated with a plurality of virtual network functions, wherein each of the plurality of virtual network functions is configured to operate on one or more virtual machines, and wherein each of the plurality of virtual network functions has a plurality of available disk images associated therewith;
   receiving a validation test for the software artifact together with a list of expected results;
   instantiating at least one of the plurality of virtual network functions for each of at least a subset of the plurality of available disk images for the at least one of the plurality of virtual network functions;
   running the validation test on the software artifact for each of at least one of the subset of the plurality of available disk images;
   measuring a performance metric for each of the validation tests;
   creating a list of performance metrics associated with each of the subset of the plurality of available disk images for which the validation test was run; and
   recommending at least one of the available disk images for the at least one of the plurality of virtual network functions based on the list of performance metrics.

2. The method of claim 1 wherein measuring the performance metric for each of the validation tests comprises:
   monitoring a set of system call invocations from the at least one of the plurality of virtual network functions to a set of system libraries caused by the validation test;
   analyzing the set of system call invocations generated by the validation test; and
   creating a list of required libraries based on the set of system call invocations generated by the validation test.

3. The method of claim 2 further comprising recording the system call invocations from the at least one of the plurality of virtual network functions to the set of system libraries caused by the validation test.

4. The method of claim 1 wherein the at least one of the plurality of virtual network functions runs on a container.

5. The method of claim 1 further comprising communicating the list of disk images with performance metrics to a developer.

6. The method of claim 1 wherein the step of running the validation test comprises running a test in which all features of the at least one of the plurality virtual network functions are invoked at least once.

7. A system comprising:
   at least one memory that stores computer-executable instructions;
   at least one processor, communicatively coupled to the at least one memory, that facilitates execution of the computer-executable instructions to:
   receive a software artifact associated with a plurality of virtual network functions configured to operate on one or more virtual machines, and wherein each of the plurality of virtual network functions has a plurality of available disk images;
   receive a validation test for the software artifact together with a list of expected results;
   instantiate at least one of the plurality of virtual network functions for each of at least a subset of the plurality of available disk images for the at least one of the plurality of the virtual network functions;
   execute the validation test on the software artifact for at least one of a subset of the plurality of available disk images;
   measure a performance metric for each of the validation tests; and
   create a list of performance metrics associated with each of the subset of plurality of available disk images for which the validation test was run; and
   recommending at least one of the available disk images for the at least one of the plurality of virtual network functions based on the list of performance metrics.

8. The system of claim 7 wherein the computer-executable instructions to measure of the performance metric for each of the validation tests comprises computer-executable instructions to:
monitor a set of system call invocations from the at least one of the plurality of virtual network functions to a set of system libraries;
analyze the set of system call invocations generated by the validation test; and
create a list of required libraries based on the set of system call invocations generated by the validation test.

9. The system of claim 8 wherein the at least one processor further facilitates the execution of the computer-executable instructions to record the set of system call invocations from the at least one of the plurality of virtual network functions to the set of system libraries caused by the validation test.

10. The system of claim 7 wherein the at least one of the plurality virtual network functions runs on a virtual machine.

11. The system of claim 7 wherein the at least one of the plurality virtual network functions runs on a container.

12. The system of claim 7 wherein the at least one processor further facilitates the execution of the computer-executable instructions to communicate the list to a developer.

13. The system of claim 7 wherein the computer-executable instructions to run the validation test comprises computer-executable instructions to run a test in which all features of the at least one of the plurality of virtual network functions are invoked at least once.

14. A non-transitory computer readable media comprising computer executable instructions that when executed perform a method comprising:
receiving a software artifact associated with a plurality of virtual network functions wherein the virtual network function is configured to operate on one or more virtual machines, and wherein each of the plurality of the virtual network functions has a plurality of available disk images;
receiving a validation test for the software artifact together with a list of expected results;
instantiating at least one of the plurality of virtual network functions for each of at least a subset of the plurality of available disk images for the at least one of the plurality of virtual network functions;
running the validation test on the software artifact for each of at least one of the subset of the plurality of available disk images;
measuring a performance metric for each of the validation tests;
creating a list of performance metrics associated with each of the subset of the plurality of disk images for which the validation test was run; and
recommending at least one of the available disk images for the at least one of the plurality of virtual network functions based on the list of performance metrics.

15. The non-transitory computer readable media of claim 14, wherein measuring the performance metric for each of the validation tests comprises:
monitoring a set of system call invocations from the at least one of the of the plurality of virtual network functions to a set of system libraries caused by the validation test;
analyzing the set of system call invocations generated by the validation test; and
creating a list of required libraries based on the set of system call invocations generated by the validation test.

16. The non-transitory computer readable media of claim 15 further comprising computer executable instructions that when executed perform the method comprising recording the system call invocations caused by the validation test.

17. The non-transitory computer readable media of claim 14 wherein the at least one of the plurality virtual network functions runs on a virtual machine.

18. The non-transitory computer readable media of claim 14 wherein the at least one of the plurality of virtual network functions runs on a container.

19. The non-transitory computer readable media of claim 14 further comprising computer executable instructions that when executed perform the method comprising communicating the list to a developer.

* * * * *